US006538690B1

(12) United States Patent
Montgomery et al.

(10) Patent No.: US 6,538,690 B1
(45) Date of Patent: Mar. 25, 2003

(54) TIMING CONTROL IN ACOUSTO-OPTIC SCANNER BASED ON ACOUSTIC VELOCITY OF TRAVELING WAVE LENS

(75) Inventors: Robert M. Montgomery; Thomas Otten; Reeder N. Ward, all of Indialantic; Mark T. Montgomery, Melbourne Beach, all of FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/520,572

(22) Filed: Mar. 8, 2000

(51) Int. Cl.⁷ .................................................. H04N 3/02
(52) U.S. Cl. ............................. 348/198; 359/305; 385/7
(58) Field of Search ............................... 348/198, 126, 348/86, 92, 87; 385/7; 367/140; 359/285, 305, 313; 356/477, 479

(56) References Cited

U.S. PATENT DOCUMENTS

| 3,617,108 | A |   | 11/1971 | Fritsch ........................ 350/96 |
| 3,675,592 | A |   | 7/1972  | Foster ......................... 178/7.6 |
| 3,935,472 | A |   | 1/1976  | Bethea et al. ............... 307/88.3 |
| 4,541,712 | A |   | 9/1985  | Whitney ....................... 355/53 |
| 4,952,892 | A |   | 8/1990  | Kronberg ...................... 333/34 |
| 4,992,858 | A | * | 2/1991  | Kobayashi .................... 358/53 |
| 4,992,880 | A |   | 2/1991  | Trias ........................ 358/236 |
| 5,191,466 | A | * | 3/1993  | Gross et al. ................. 359/305 |
| 6,047,924 | A | * | 3/2000  | Montgomery et al. ...... 359/285 |
| 6,052,215 | A | * | 4/2000  | Montgomery et al. ...... 359/285 |

OTHER PUBLICATIONS

Yao S K et al, "Guided acoustic traveling wave lens for high–speed optical scanners", Applied Optics, Feb. 1979, USA, vol. 18, No. 4, pp. 446–453, XP002179654, ISSN: 0003–6935, p. 446–p. 447.

Kusch S et al: Eikonalaenderungen Bei Akustischen Lichtablenksystemen Infolge Von Temperaturefekten: Experimental Technique of Physics, Heldermann verlag, Berlin, DE, vol. 21, No. 1, 1973, pp. 59–64, XP001006037, ISSN: 0014–4924, p. 59–p. 60.

"Guided Acoustic Traveling Wave Lens for High–Speed Optical Scanners", by S.K. Yao, D. Weid, and R. M. Montgomery, from Applied Physics, vol. 18, No. 4, pp. 446–453; Feb. 15, 1979.

* cited by examiner

*Primary Examiner*—Victor R. Kostak
(74) *Attorney, Agent, or Firm*—Allen, Dyer, Doppelt, Milbrath & Gilchrist, P.A.

(57) ABSTRACT

Pixel clock and beam scan timing of an acousto-optic scanner are controlled by an acoustic velocity-driven, phase locked loop containing an adjustable voltage controlled pixel clock generator, which is controlled by a detector that produces delayed and attenuated replica of the excitation waveform applied to an ATWL scanner used to scan a light beam across a workpiece. In a first embodiment of the invention, an end-of-cell transducer converts the pressure induced traveling lens into an electrical signal replica of the excitation input. In a second embodiment, an end-of-scan optical pick-off monitor is employed to detect the scanned optical spot as it crosses its field of view. Each pixel is spatially invariant to propagation velocity changes in the ATWL medium, so that as variations in temperature change the speed of the pressure-induced lens traveling from the excitation transducer to the end of the ATWL cell on each scan, the pixel clock is correspondingly slowed down or speeded up by the same proportional amount, to maintain registration in time and space.

19 Claims, 2 Drawing Sheets

TIMING CONTROL IN ACOUSTO-OPTIC SCANNER BASED ON ACOUSTIC VELOCITY OF TRAVELING WAVE LENS

FIELD OF THE INVENTION

The present invention relates in general to acousto-optic scanners, and is particularly directed to an arrangement and method for controlling pixel clock and scan timing of an acousto-optic scanner, in accordance with the acoustic velocity of an acoustic wave lens (ATWL) traveling through the scanner's acousto-optic waveguide.

BACKGROUND OF THE INVENTION

A number of industrial systems for conducting extremely high resolution optical scanning of a workpiece, such as a semiconductor substrate, may employ an acousto-optic Bragg cell-based scanner. Critical to success of operation of such systems is the need for extreme precision in the alignment of the light beam and the workpiece. An acoustic traveling wave lens (ATWL) scanner is capable of providing such position accuracy while scanning at very high speed. This positioning accuracy of the ATWL scanner is derived from the fact that the scan progresses with a traveling acoustic wave in a highly stable material, such as fused silica.

Fused silica has excellent dimensional stability due to its low thermal expansion coefficient of $0.6 \times 10^{-6}$ per degree Centigrade. However, the variation in the acoustic velocity of fused silica is much higher. The temperature coefficient for scan velocity is near $1 \times 10^{-4}$ per degree Centigrade. As a consequence, the principal placement error in an ATWL scanner arises from the change in acoustic velocity with temperature. It is common practice to vary the sampling time during a scan, in order to compensate for scanner placement errors. Namely, the time of taking or exposing samples is varied in such a way as to cause the samples to occur in the proper place on spatial sampling grid.

SUMMARY OF THE INVENTION

The present invention is directed to a new and improved apparatus and method for generating a pixel clock for an ATWL-based optical scanner, wherein the pixel clock is varied in such a manner to provide a uniform and constant sampling grid, independently of small acoustic velocity variations in the ATWL propagation medium. As will be described in detail below, the pixel clock is derived as a function of the propagation velocity in the ATWL medium in such a manner to render each pixel spatially invariant to propagation velocity changes in the ATWL medium. This means that as changes in temperature retard or increase the speed of the pressure-induced lens traveling from the excitation transducer to the end of the ATWL cell on each scan, the pixel clock is correspondingly slowed down or speeded up by the same proportional amount, so as to maintain registration in time and space. The compensation mechanism employed by the present invention measures the time it takes for the pressure induced lens to travel the length (or large portion thereof) of the ATWL cell. It then forces the pixel rate to produce a desired number of pixels within the same time interval.

In accordance with the invention, scanner system timing is governed by an acoustic velocity-driven, phase locked loop containing an adjustable voltage controlled pixel clock generator (VCXO), which is controlled by a detector that produces delayed and attenuated replica of the excitation waveform applied to an ATWL scanner used to scan a light beam across a workpiece. Pursuant to a first embodiment of the invention, an end-of-cell transducer converts the pressure induced traveling lens into an electrical signal replica of the excitation input. In a second embodiment, an end-of-scan optical pick-off monitor is employed to detect the scanned optical spot as it crosses its field of view.

The pixel rate clock signal is used to locate spatially repeatable time instances along the optical scan of the ATWL scanner. The pixel rate clock signal is coupled to a subharmonic rate generator, which outputs a relatively low rate clock signal having pixel registration edges, so as to facilitate scan cycle timing events through use of commercially available logic devices. The reduced rate clock signal is used to clock a cycle timing generator, programmable delay line, a set of cascaded flip-flops, and an up/down counter that drives a digital-to-analog converter (DAC) whose output of which is used to adjust the clock rate of the VCXO.

Using the low rate clock signal produced by the subharmonic rate generator, the cycle timing generator initiates a scan cycle and all subsequent scan events, in response to an externally sourced scan request strobe. This programmable delay line provides for fine tuning of the pixel rate VCXO about its nominal center of range of operation, and thereby allows the full VCXO range of to be applied to pixel rate compensation due to temperature-induced propagation velocity changes experienced by the ATWL scanner under normal operating conditions. Also the small fixed propagation delays associated with various other devices, cables, filters, etc., are readily removed using the programmable delay line.

The output of the delay line is coupled to a direct digital synthesis (DDS) based five-cycle burst generator that is enabled for a prescribed number of subharmonic cycles (beginning at a first selected ATWL gate clock count terminating at a second clock count of the output of the cycle timing generator. This produces a scanner excitation waveform comprised of a fixed plurality of cycles of a reduced clock signal. This excitation waveform is low pass filtered to produce a filtered burst signal that is amplified and applied to the ATWL scanner by way of an input transducer.

The acoustic traveling wave lens scanner cell may comprise of section of optical material that supports the propagation of a pressure wave (or series of acoustic waves) with low attenuation along its length from the input transducer to an output detector (end-of-cell output transducer in the first embodiment, end-of-scan optical monitor in the second embodiment). The traveling pressure wave creates a lens that provides a relatively high spot resolution of the deflected optic beam aligned with the lens as it travels the length of the ATWL cell.

A buffer amplifier and zero-crossing comparator coupled to the scanner detector output amplify the output signal derived from the ATWL scanner and convert the attenuated, delayed replica of the scanner's excitation signal into logic levels that are sampled for polarity. The first of the two cascaded flip-flops monitors the output of the zero-crossing comparator, while the second flip-flop monitors the output of the first flip-flop. The first flip-flop determines if a selected (e.g., third negative-going) zero-crossing of the delayed excitation replica of the scanner's input burst signal occurs early or late, relative to a particular pixel subharmonic cycle's leading edge, and samples and stores this decision. The second flip-flop reduces the probability of a metastable output being coupled to the up/down counter.

The up/down counter increments on a relatively later (e.g. 298th) subharmonic cycle produced by the cycle timing generator, if the digital input to the counter from the second flip-flop is a logical "zero"—indicating that third negative-going zero crossing of the delayed replica of the scanner's excitation burst had already occurred prior to a slightly earlier (e.g., 296th) subharmonic cycle sampling the first flip-flop. Conversely, loading "one" is loaded into the first flip-flop on the 296th subharmonic cycle indicates that the pixel clock rate is too fast, since the leading edge of the 296th subharmonic cycle occurred before the third cycle's negative going zero-crossing of the excitation replica (i.e., the subharmonic cycle was early) and the up/down counter is decremented by one. The DAC produces an analog voltage proportional to the digital count stored in the up/down counter. At a minimum count, the DAC generates a voltage to drive the VCXO to its minimum output frequency (300 MHz–200 ppm), while at a maximum count it generates a voltage to drive the VCXO to a maximum output frequency (300 MHz+200 ppm).

The servo-mechanism of the invention operates to align the 296th pixel subharmonic cycle's leading edge with the third negative going zero-crossing of the replica of the scanner's excitation burst applied to the ATWL scanner and derived by the scanner's output device in response to the resultant propagating pressure waves through the cell. The excitation waveform applied to the ATWL scanner is initiated with the tenth pixel subharmonic cycle of the scan, so that to a first order approximation, there are 286 subharmonic cycles between excitation initiation and the third negative going zero-crossing of the excitation replica as the traveling lens exits the ATWL scanner.

As the propagation velocity of the acoustic wave lens traveling through the scanner varies with temperature changes in the ATWL cell, the pixel rate is changed to maintain the alignment of the 296th pixel subharmonic cycle's leading edge with the third negative going zero-crossing of the excitation replica. Tracking resolution is determined by the dynamic range of the DAC and the up/down counter. Dispersion effects in comparator outputs, D-flip-flop set-up boundaries, and the pixel rate divider contribute a dynamic timing error which is introduced as averaged low level "noise." This averaging is accomplished by employing very fine steps (e.g., on the order of one picosecond) and assuming dispersion time-invariance from scan to scan. Pixel clock registration with the traveling lens is limited by the pulling range of the pixel VCXO, so that propagation velocity changes within the ATWL cell are limited to the pulling range. This can be accomplished by regulating the ATWL temperature to within ±2° C., if a quartz is used as the material for the ATWL cell.

In the second embodiment, scanner system timing is controlled by an end-of-scan optical monitor, a narrow optical aperture element is coupled to a high pass filter, which behaves as a time differentiator to augment the end-of-scan spot's time-of-arrival decision thresholding. If the end-of-scan optical aperture is sufficiently narrow, the spot illumination captured by the optical detector will be representative of the spot profile in time. By using a time differentiator, the zero-crossing comparator of the first embodiment may be employed, and a determination can be better made of the center of the spot rather than of one edge or the other.

If the monitoring aperture is not sufficiently small, the scanned spot will tend to produce a "flat top" response, while most of the spot falls within the monitoring aperture. In this instance, a zero-crossing comparator cannot be used, since the time differentiator will produce a positive response, as the positive leading edge is experienced that will return to zero as the "flat" response ensues. It will produce a negative response as the spot's negative-going trailing edge is experienced, which will return to zero after the scanned spot leaves the aperture. Hence, the zero-crossing detection will not be activated properly, since a 'decisive' zero-crossing event does not occur.

To obviate this potential problem, a "knife-edge" element can be placed towards the far side of the active detector area, so that a spot amplitude estimate can be made, and half this value can be used as a decision crossing threshold by a comparator, as the midpoint of the spot encounters the "knife edge" element. Placing the "knife edge" element towards the far side of the active sensitivity area of the optical detector also allows the initial response of this mid-value comparator to stabilize, "long" before the desired pixel subharmonic cycle's leading edge samples the comparator output, to achieve alignment with the (negative) threshold crossing, produced as the "knife-edge" blocks the midpoint of the spot.

Each embodiment shares a number of common aspects that enable the functionality of the invention to be realized. The first involves the use of a divided down subharmonic (e.g., divide by eight or ten) that retains every fine time phasing with a high pixel rate clock (e.g., 300 MHz), since it is not necessary to generate all the scan cycle event timing at the high pixel rate; instead it is more cost effective to perform these with the use of CMOS or TTL elements at 50 MHz or less. The only restriction this imposes is to require that events occur on the subharmonic edge boundaries. The primary events include the initiation of the ATWL excitation and the desired number of integer subharmonic cycles that exist between excitation and either a particular zero-crossing end-of-cell transducer signal waveform or the end-of-scan optical monitor experiencing the scanned spot in its field of view.

A second feature involves how the treatment of time/phase error. In both embodiments, a single early/late decision is made at the scan. The pixel rate is then changed by only a very small amount in the direction to reduce the time/phase error. The next early/late decision will either result in another change in the same direction as before and by the same small amount, or it will reverse the effect of the previous early/late decision. This produces a tracking effect with inherent filtering.

A third aspect of the invention obviates the need for a start of scan optical pick-off to provide pixel registration at the workpiece. Instead, start of scan is provided as a single, gated pulse at the pixel subharmonic rate, which occurs a desired number subharmonic cycle intervals prior to the early/late decision event.

DETAILED DESCRIPTION

Figure 1:
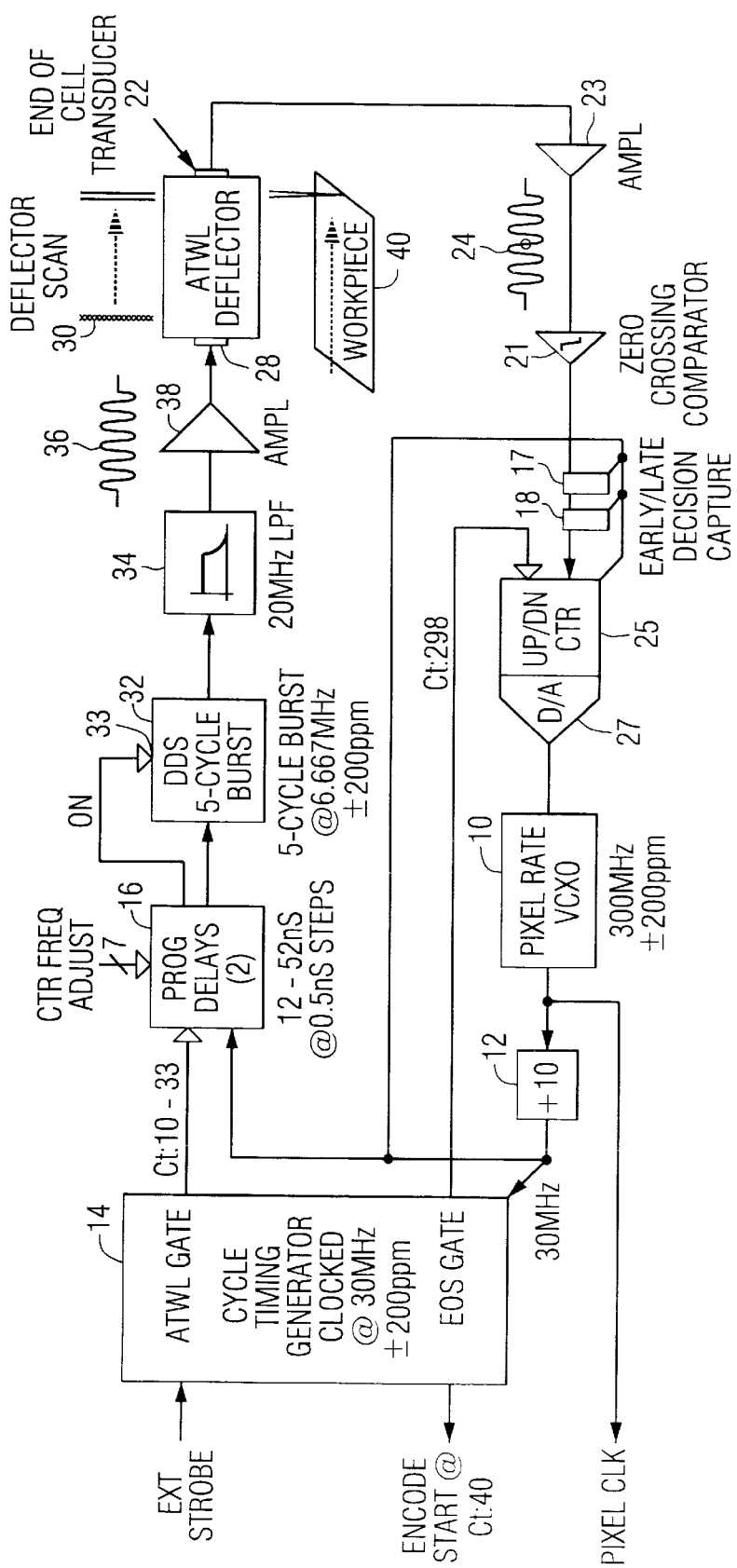
FIG. 1 diagrammatically illustrates a pixel clock-based embodiment of a timing system for an acousto-optic scanner system in accordance with a first embodiment of the invention using an end-of-cell transducer.

Before detailing the acoustic velocity compensated timing control circuitry of the present invention, it should be observed that the invention resides primarily in what is effectively a prescribed arrangement of conventional acousto-optic scanner and associated signal processing circuits and components and a supervisory digital signal processor, that controls the operation thereof. Consequently, the configuration of such circuits and components and the manner in which they are interfaced with other acousto-optic scanner system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of a traveling wave lens acousto-optic scanner architecture in a convenient functional grouping, whereby the present invention may be more readily understood.

Moreover, for purposes of providing a non-limiting example, the following parameters will be employed: the pixel rate during the active scan interval is 300 MHz; the scan repetition rate is not to exceed 100 KHz; the number of active pixels per scan is equal to or exceeds 2500; a scan request (Ext Strobe) initiates each scan; and a start-of-active scan (Encode Start) is used to indicate the beginning of each scan,s active interval. Derivative parameters the result from this illustrative set of requirements include setting the length of the ATWL medium (e.g., at a length of 10 microseconds) to accommodate a desired active scan interval of 8.33 microseconds.

In order to provide an ATWL with the desired pressure-induced lensing power, a prescribed excitation waveform is produced. As will be described, a five-cycle burst at 6.667 MHz will produce the desired ATWL, creating five lenses with converging properties and five lenses with diverging properties. Within this set of five lenses, the third or middle lens with converging properties is selected as the ATWL that is registered to the incoming deflected light scan, to more sharply focus the output scanned light beam. It should be noted, however, that the number of cycles within the burst may vary as long as at least one ATWL of desired optical quality is formed. Is should also be observed that the mechanism employed to generate the ATWL excitation burst is not limited to the use of a direct digital synthesizer (DDS), although such a device provides a relatively convenient means to remove small residual timing registration errors. Furthermore, the invention does not preclude timing events generated at the pixel rate (or even higher harmonics of the pixel rate), if the timing requirements dictate it or if that method of implementation is chosen.

End-of-Cell Transducer-Based Timing System (FIG. 1)

As described briefly above, pursuant to a first embodiment of the invention, a block diagram of which is shown in FIG. 1, scanner system timing is controlled by an acoustic velocity-driven, phase locked loop containing an adjustable voltage controlled crystal oscillator (VCXO)-based pixel clock generator 10, the operation of which is controlled by using an end-of-cell transducer 22, which outputs a delayed and attenuated replica of the excitation waveform applied to an ATWL scanner or beam deflector 20 used to scan a light beam 30 across an object or workpiece 40. For purposes of providing a non-limiting example, the pixel rate VCXO 10 may nominally output a 300 MHz pixel rate clock signal (+/−200 ppm).

This pixel rate clock signal is used to locate spatially repeatable time instances along the optical scan of the ATWL scanner 20. The pixel rate clock signal is coupled to a subharmonic rate generator 12, which may be readily implemented as a divide-by-k (e.g., k=10) counter, and outputs a relatively low rate clock signal having pixel registration edges to facilitate scan cycle timing events through use of common CMOS or TTL logic devices. The use of a subharmonic rate clock allows much of the timing processing to be performed at a lower frequency (e.g., on the order of 30 MHz), rather than at a high pixel rate (e.g., 300 MHz). For the parameters of the present example, the resulting 10×granularity is an acceptable trade-off, since such a granularity is small (33.3 ns) relative to the total ATWL delay (10 microseconds).

The reduced rate 30 MHz clock signal generated by the divide-by-k counter 12 is coupled to a cycle timing generator 14, a programmable delay line 16, the clock signal inputs of cascaded D-type flip-flops 17 and 18, and to an up/down counter 25, which drives a digital-to-analog converter (DAC) 27, the output of which is used to adjust the clock rate of the clock signal generated by the VCXO 10. Flip-flop 17 has its data input coupled to receive the output of a zero-crossing comparator 21, such as a hard-limiter, which is coupled through a buffer amplifier 23 to end-of-cell transducer 22.

Using the 30 MHz clock signal from subharmonic rate generator 12, the cycle timing generator 14 is operative to initiate a scan cycle and all subsequent scan events, in response to an externally sourced scan request strobe (Ext Strobe) after the strobe has been qualified at the pixel subharmonic rate. A first timing generator path is coupled to the programmable delay line 16, which provide the means to fine tune the pixel rate VCXO to its nominal center of range of operation. This is necessary because the delay from ATWL excitation to the output of the end-of-cell transducer 22 should nominally be adjusted to an integral number of subharmonic delay cycles (i.e., very small residue), in order to operate the pixel rate VCXO 10 at its center of range under ideal conditions.

This allows the full VCXO range of ±200 ppm to be applied to pixel rate compensation due to temperature-induced propagation velocity changes experienced by the ATWL scanner 20 under operating conditions. It should be noted that under nominal conditions the ATWL scanner 20 will most likely not produce an integral subharmonic delay; also, various other devices, cables, filters, etc., exhibit relatively small fixed propagation delays, which also accumulate to contribute to the delay residue, which is removed using the programmable delay line 16.

The output of the delay line 16 is coupled to a direct digital synthesis (DDS) based five-cycle burst generator 32 that has its reset input 33 reset for 23 subharmonic cycles (beginning at an ATWL gate clock count of 10 (ct:10) and terminating at a clock count of 33 (ct:33) of the output of the cycle timing generator 14. This results in burst generator 33 generating a scanner excitation waveform comprised of five cycles of a 6.667 MHz clock signal. This excitation waveform may be low pass filtered, for example, by means of a 20 MHz low pass filter 34, to produce a filtered burst signal 36, from which image sampled components present in the DDS or tune-sampled waveform have been removed. It may be noted that this 20 MHz filter may be changed to another value closer to the burst rate (6.667 MHz, in the present example), or may be omitted altogether, since the ATWL's frequency response will effectively accept the 6.667 MHz burst and not respond significantly to other higher frequency components. For example, operating the DDS generate 32 at 300 MHz, with 45 samples/cycle would not require much filtering.

The filtered burst signal 36 is coupled to a power amplifier 38, which supplies the gain and dynamic range to effectively excite the ATWL scanner 20 by way of an electrical pressure input transducer 28. The acoustic traveling wave lens scanner or cell 20 may comprise of section of optical material that will support the propagation of a pressure wave (or series of acoustic waves) with low attenuation along its length from input transducer 28 to end-of-cell output transducer 22. The traveling pressure wave creates a lens that provides a relatively high spot resolution of the deflected optic beam 30 that is aligned with the lens as it travels the length of the ATWL cell 20.

The combination of the buffer amplifier 23 and zero-crossing comparator 21 serves to amplify the output signal derived from the ATWL scanner's end-of-cell transducer 22, and converts the attenuated, delayed replica of the scanner's excitation signal, shown at 24, into logic levels that are sampled for polarity. The hard limiter levels of the zero-crossing comparator are set such that a voltage above ground is converted to a voltage level that may be readily accepted by digital logic devices as a logical "one", and a voltage level equal to or less than ground is converted to a logical "zero".

Within the cascaded arrangement of the two D-type flip-flops 17 and 18, the first flip-flop 17 monitors the output of the zero-crossing comparator 21; the second flip-flop 18 monitors the output of the first flip-flop 17. As will be described, the servo-mechanism executed by the system of FIG. 1 is operative to have the first flip-flop 17 determine if a selected (e.g., third negative-going) zero-crossing of the delayed excitation replica of the scanner's input burst signal occurs early or late, relative to a particular (i.e., the 296th) pixel subharmonic cycle's leading edge, which samples (and stores this decision). The purpose of the second flip-flop 18 is to reduce the probability of a metastable output (neither a reliable logical "one" or "zero" state) being coupled to up/down counter 25.

The up/down counter 25 increments (up) on the 298th subharmonic cycle (ct:298) produced by the cycle timing generator 14, if the digital input to the counter from the second flip-flop 18 is a logical "zero"—indicating that third negative-going zero crossing of the delayed replica of the scanner's excitation burst 36 had already occurred prior to the 296th subharmonic cycle sampling the first flip-flop 17, i.e., the subharmonic cycle was late. Conversely, if a logical "one" was loaded into the first flip-flop on the 296th subharmonic cycle, this would indicate that the pixel clock rate is too fast, since the leading edge of the 296th subharmonic cycle occurred before the third cycle's negative going zero-crossing of the excitation replica (i.e., the subharmonic cycle was early) and the counter 25 is then decremented by one.

The DAC 27 generates an analog voltage that is proportional to the digital count stored in the up/down counter 25. At a minimum count (zero), DAC 27 generates a voltage that drives the VCXO 10 to its minimum output frequency (i.e., 300 MHz−200 ppm), while at its maximum count it generates a voltage to drive the VCXO 10 to its maximum output frequency (i.e., 300 MHz+200 ppm).

In operation, the servo-mechanism elements aligns the 296th pixel subharmonic cycle's leading edge with the third negative going zero-crossing of the replica of the scanner's excitation burst applied to input transducer 28 of the ATWL scanner 20 and derived by the scanner's end-of-cell transducer 22 in response to the resultant propagating pressure waves through the cell.

Recalling that the excitation waveform 36 applied to the scanner 20 is initiated with the tenth pixel subharmonic cycle (ct:10) of the scan, then to a first order approximation, there are 286 subharmonic cycles between excitation initiation and the third negative going zero-crossing of the excitation replica as the traveling lens exits the ATWL scanner 20. As the propagation velocity of the acoustic wave lens traveling through the scanner 20 varies in response to temperature changes experienced in the ATWL cell 20, the pixel rate is also changed to maintain the alignment of the 296th pixel subharmonic cycle's leading edge with the third negative going zero-crossing of the excitation replica.

Tracking resolution is determined by the dynamic range of the DAC 27 and up/down counter 25. If a twelve-bit DAC and twelve-bit up/down counter are used to respond to early/late alignment decisions of the 296th pixel subharmonic cycle's leading edge, then the minimum resolution is 400 ppm÷4096=0.1 ppm. For the present example, a 0.1 ppm resolution will result in a "hunting" error of 0.95 picosecs. peak-to-peak, or ±0.5 picosec. Namely, ((286×10) pixels/300,000,000 pixels/sec)× 0.1ppm=0.95×10e−12 sec.=0.95 picosec.

It may be noted, however, that dispersion effects in comparator outputs, D-flip-flop set-up boundaries, and the pixel rate divider contribute a much greater dynamic timing error (i.e., approximately ±150 ps), which is introduced as "noise" that is averaged to a much lower level (i.e., ±12 ps=±0.4% of a pixel). This averaging is accomplished in a great part by the tracking mechanism employing very fine steps of approximately one picosecond and assuming dispersion time-invariance from scan to scan.

Pixel clock registration with the traveling lens in the present embodiment is limited by the ±200 ppm pulling range of the pixel VCXO 10. This means that the propagation velocity changes within the ATWL cell 20 be limited to ±200 ppm. This can be accomplished by regulating the ATWL temperature to within ±2°C., if a quartz is used as the material for the ATWL cell 20.

In the course of a practical implementation of the ATWL scanner timing tracking architecture of FIG. 1, the following aspects of the system may be noted. In the first order approximation for determining the number of pixel cycles that result from excitation initiation at the scanner's input transducer 28 to the end-of-cell transducer 22 response and the subsequent early/late timing decision that ensues, initiation of the excitation waveform relates to the beginning of the waveform and not the replica's third zero-crossing event at which pixel registration will occur. Hence, an additional interval of 2.5 cycles of the excitation waveform at 6.667 MHz (i.e., nominally 375 nanosec.) is added to the time it takes for the traveling lens to propagate the length of the ATWL cell 20.

If this results in a fixed interval of time, then spatial pixel invariance at the start of scan would not be maintained due to the invariance of this fixed interval in time, when compared to the variation experienced in propagation delay and responded to by pixel rate adjustment to maintain alignment at the end of scan. By employing the DDS 32 to generate the ATWL excitation burst, however, where the frequency word loaded into the DDS 32 is not changed and its reference frequency derived from the pixel rate is varied, the resulting excitation waveform is also varied by proportionally the same amount. This causes the third negative going zero-crossing of the excitation waveform to be delayed or advanced as required, so as to guarantee spatial invariance of the pixel positions at the start of scan.

With respect to propagation delays resulting from amplifier transit times, filter group delays, cable propagation delays, etc. and the ganged programmable delay used to nominally register the excitation replica waveform to the desired integer pixel subharmonic cycle, the following may be noted. For purposes of illustration, the sum of these delays can be assumed to be fixed, relative to the delay variation exhibited due to propagation velocity changes experienced within the ATWL cell 20. As a non-limiting example, the sum of a typical group of effectively fixed device delays may comprise amplifier transit times of 2ns each for the two amplifiers 23 and 38, a zero-crossing comparator delay of 5 nanosec., a nominal D-flip-flop set-up delay of 3 ns, a group delay of 32 ns for a 5-pole Butterworth 20 MHz low pass filter (LPF) 34, a maximum programmed delay of 52 ns for delay line 16, and ten feet of cabling at 1.5 ns per foot. These delays total up to 111 ns. Therefore, the start of scan registration is not spatially invariant; it deviates from nominal by 111 ns×± 200 ppm=±22 picosec., which represents approximately ±0.6% of a pixel period for the current example. It should be noted that further along the scan, this deviation in pixel registration is reduced and that finally at the end of scan, it is essentially eliminated.

It is possible to reduce the small lack of spatial invariance that results at the start of scan, as a result of pushing the pixel rate ±200 ppm from nominal and how it interacts with the small "fixed" time delay of the various devices in the architecture of FIG. 1. As noted previously, the pixel variation at the start of scan is proportional to how far the pixel VCXO 10 is driven by the up/down counter value feeding the DAC 27. This drive value is available, and hence the effect it has on registration at the start of scan can be predicted reasonably well. Achieving the desired change resides with the ability to modify the DDS 5-cycle burst generator frequency word, so as to introduce a small compensating frequency offset to the nominal value.

Since the 111 ns "fixed" delay of the present example represents 29.6% of the time interval that the third negative going zero-crossing of the excitation waveform takes to enter the ATWL scanner 20, relative to the waveform initiation, i.e., 111 ns÷375 nS=0.296, it will require that 0.296×(±VCXO drive deviation in ppm) be subtracted from the nominal 6.667 MHz frequency word programmed into the DDS-based 5-cycle burst generator 32. Frequency word changes can be updated on a per scan basis and placed into effect at the time the excitation waveform is initiated.

As noted above, a start of scan timing signal (Encode Start @ ct:40) is produced by the cycle timing generator 14 for external use in identifying the start of a desired scan segment. Namely, the start of scan signal is generated at a particular, programmable pixel subharmonic cycle count following the initiation of the ATWL excitation waveform. Hence, the first pixel rate clock following the leading edge of the start-of-scan signal identifies the start of the desired scan segment. This restricts the start of scan to occur on ten pixel boundaries, unless a programmable delay is incorporated in the start of scan, which allows it to be delayed in half-pixel increments over a range of ten or more pixels.

It may further be noted that the 0.5 ns resolution for the programmable delay line preceding the DDS-based 5-cycle burst generator 32 leaves up to a 50 ppm offset in the 300 MHz pixel rate VCXO 10. Any further offset reduction can easily be obtained by inserting a short length of cable at a convenient location anywhere between the 20 MHz LPF 34 and the amplifier 38.

It may further be noted that scan initiation is not intimately synchronized to the external timing strobe. Instead, the external strobe event is qualified by two or three pixel subharmonic cycle edges, in order to minimize metastability, and then the cycle timing generator 14 initiates the next scan. This will restart an optical spot deflector (not shown in FIG. 1); also, it will initiate the ATWL excitation waveform several subharmonic cycle periods later, as required to achieve a deflected spot registration with the pressure induced traveling lens formed in the ATWL scanner 20. For the present example, this approach to scan synchronization to a external strobe produces a 1.5±0.5 subharmonic cycle response delay (i.e., 50 ns±17 ns) in scan initiation with no coupling to the pixel rate compensation processes. It should be noted that it is necessary to issue scans in a somewhat periodic manner, so as to allow pixel rate compensation to be maintained at close to the nominal scan cycle interval. Hence, in the absence of an external timing strobe, i.e., during idle intervals, the cycle timing generator 14 will initiate ATWL scan excitations and the necessary timing events to maintain pixel rate registration.

Where an external timing strobe is not provided, the scanner is required to develop the cycle timing at some defined rate. In this instance, when the end of a scan cycle is reached by the cycle timing generator 14, an additional count down delay may be initiated; when that additional count down delay has expired, it automatically restarts the scan. The additional count down delay is programmed to increase the scan cycle period as desired. For example, the scan may be restarted at the count of 300 pixel subharmonic cycles to produce a 10 μs scan cycle period. If the addition delay is programmed to count down by 60, then 2 μs is added top the scan cycle which results in a 12 μs period. For ease of implementation, the minimum delay increment in the programmed scan cycle period may be set to 33 ns.

In the present example, the response of zero-crossing comparator 21 to the third negative going zero-crossing in the excitation replica signal derived from the end-of-cell transducer 2 is a-zero crossing of a waveform with a 150 ns period that has been amplified, so that the comparator output waveform dispersion is expected to be influenced by noise, as well as inherent dispersion to an idealized "sharply" transitioning input. Further amplification of the input waveform to create a "sharper" transition also amplifies any noise, and dispersion reduction may be difficult. This potential problem may be readily resolved by the second embodiment of FIG. 2, to be described.

Registration of the scanned spot upon the workpiece 40 relates to the degree of spatial invariance provided in the pixel rate and hence pixel positions along the scan of the traveling lens. If there is a need to register the pixels and the start of a scan at the workpiece due to small and/or slow positional variations between the workpiece and the ATWL cell 20, it will be necessary to provide an optical pick-off with optical to electrical conversion (e.g., a photodiode operating in the conductive mode followed by a transimpedance amplifier) either at the start of scan or the end of scan to achieve pixel alignment to the scanning spot as it crosses a small aperture or abrupt edge in the field of view of the optical pick-off. This is addressed in the second embodiment of the invention shown in FIG. 2 and described below.

Figure 2:
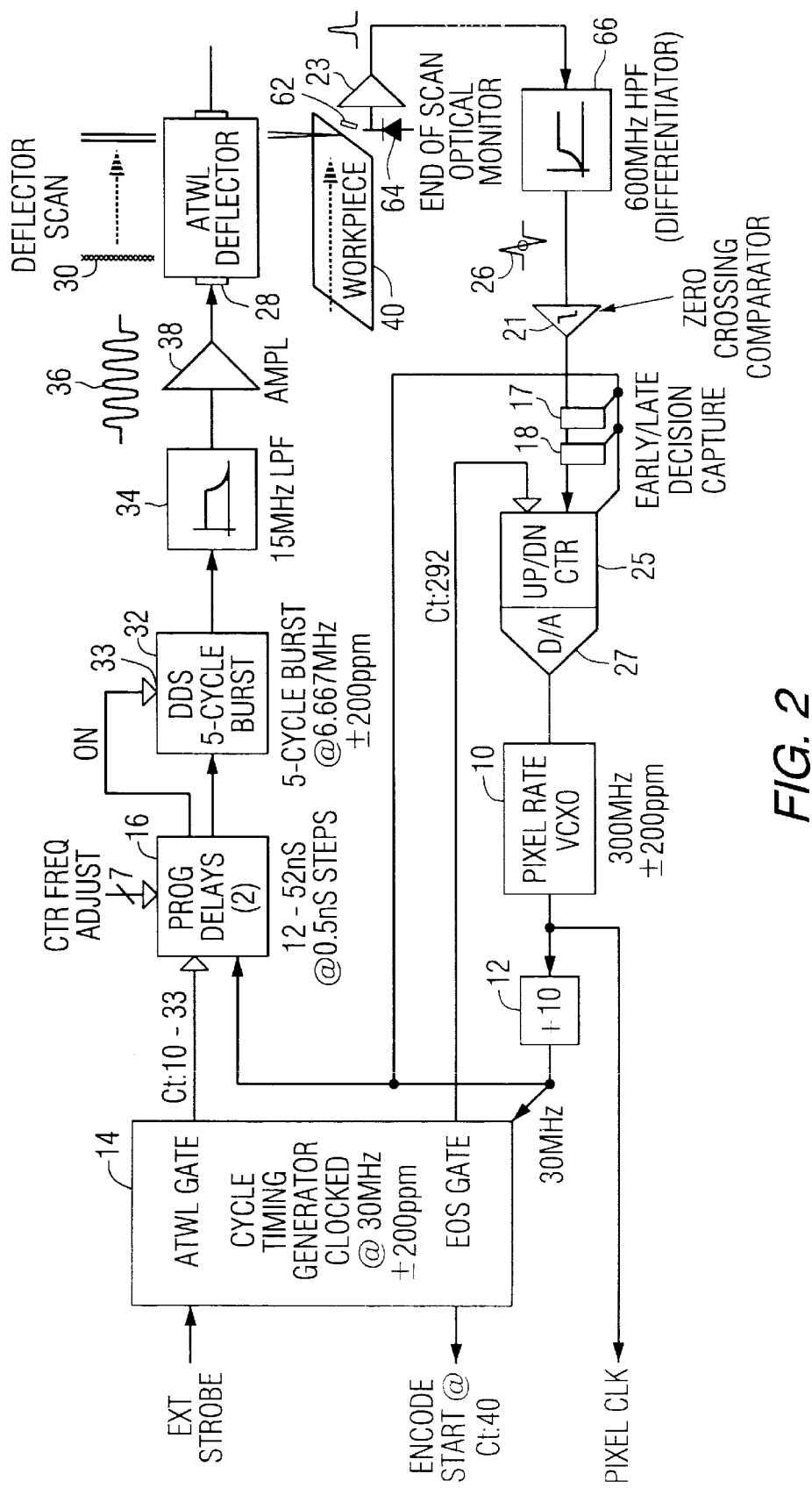
FIG. 2 diagrammatically illustrates a pixel clock-based embodiment of a timing system for an acousto-optic scanner system in accordance with a second embodiment of the invention using an end-of-scan optical monitor.

End-of-Scan Optical Monitor-Based Timing System (FIG. 2)

FIG. 2 diagrammatically illustrates a VCXO sourced ATWL scanner, which has an architecture essentially as shown in FIG. 1, described above, but having scanner system timing controlled by an end-of-scan optical monitor shown, in place of the end-of-cell transducer in the embodiment of FIG. 1. The embodiment of FIG. 2 includes a narrow optical aperture element 64 (e.g., photodiode) coupled through buffer amplifier 23 to a (600 MHz) high pass filter 66, which behaves as a time differentiator to augment the end-of-scan spot's time-of-arrival decision thresholding.

If the end-of-scan optical aperture 62 is sufficiently narrow, the spot illumination captured by the detector 64 will be representative of the spot profile in time, e.g., approximately 3.4 ns wide at the halfpower points of the present example. By using a time differentiator, the zero-crossing comparator 21 can be employed, and a determination can be better made of the center of the spot (shown at signal trace 26) rather than of one edge or the other. However, if the monitoring aperture cannot be made sufficiently small, the scanned spot will tend to produce a "flat top" response, while most of the spot is within the monitoring aperture. In this case, a zero-crossing comparator cannot be used, since the time differentiator will produce a positive response, as the positive leading edge is experienced that will return to zero as the "flat" response ensues, and then it will produce negative response as the spot's negative-going trailing edge is experienced, which again will return to zero after the scanned spot leaves the aperture. Hence, the zero-crossing detection will not be activated properly, since a 'decisive' zero-crossing event does not occur.

On the other hand, if the end-of-scan optical aperture cannot be made sufficiently small, a "knife-edge" element 62 can be placed towards the far side of the active detector area, so that a spot amplitude estimate can be made, and half this value can be used as a decision crossing threshold by comparator 21, as the midpoint of the spot encounters the "knife edge" element 62. Placing the "knife edge" element 62 towards the far side of the active sensitivity area of the optical detector 64 also allows the initial response of the comparator 21 to stabilize, "long" before the desired pixel subharmonic cycle's leading edge samples the comparator output, to achieve alignment with the (negative) threshold crossing.

Regardless of which end-of-scan optical monitor and decision threshold crossing implementation is used, jitter (dispersion) in the decision observed is inherently reduced relative to that realized using an end-of-cell transducer output, as in the embodiment of FIG. 1 since, in the present example, the transition interval involved in the decision threshold crossing is in the order of 3 ns. rather than 75 ns (i.e., 150 ns excitation cycle period ÷2). As a result, dispersion encountered in the second embodiment will be dominated by device dispersion performance and not by amplified noise effects.

As will be appreciated from the foregoing description, the pixel clock control mechanism for an ATWL-based optical scanner in accordance with the present invention is operative to vary a pixel clock as a function of the propagation velocity in the ATWL medium, by measuring measures the time it takes for the pressure induced lens to travel through the ATWL cell, and then forcing the pixel clock to produce a desired number of pixels within the same time interval. This results in each pixel being spatially invariant to propagation velocity changes in the ATWL medium. As a consequence, as variations in temperature change the speed of the pressure-induced lens traveling from the excitation transducer to the end of the ATWL cell on each scan, the pixel clock is correspondingly slowed down or speeded up by the same proportional amount, to maintain registration in time and space.

While we have shown and described several embodiments in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed is:

1. For use with an acousto-optic scanner having an acousto-optic medium, into which an acoustic traveling wave lens (ATWL) is launched from an acoustic transducer in accordance with an ATWL burst signal that is used to define the spatial size of a light beam scanned across said acousto-optic medium as said light beam is modulated by said ATWL, a method of maintaining a constant scanner pixel rate irrespective of variations in said acousto-optic medium, said method comprising the steps of:

(a) generating said ATWL burst signal in accordance with a clock signal;

(b) controlling said clock signal in accordance with the it acoustic velocity of said ATWL through said acousto-optic medium.

2. A method according to claim 1, wherein step (b) as comprises adjusting said clock signal in accordance with a phase-locked loop having a control path that includes said ATWL through said acousto-optic medium.

3. A method according to claim 2, wherein said phase-locked loop includes a clock signal feedback path associated with a nominal value of said acoustic velocity delay.

4. A method according to claim 3, wherein, in step (b), said phase-locked loop is operative to produce an acoustic velocity delay error signal in accordance with said control path and said clock signal feedback path, and further including adjusting said clock signal in accordance with said acoustic velocity delay error signal.

5. A method according to claim 1, wherein said ATWL burst signal comprises a prescribed number of cycles of said clock signal, and step (b) comprises (b1) generating a delayed burst signal containing said prescribed number of cycles at a frequency determined to produce the required lens shape in said acousto-optic medium at a time that is delayed relative to said ATWL burst control signal as determined by a nominal value of said acoustic velocity delay, (b2) generating an output signal representative of said ATWL that has traveled through said acousto-optic medium, (b3) adjusting said clock signal in accordance with said output signal.

6. A method according to claim 5, wherein step (b2) comprises generating said output signal representative of said ATWL that has traveled through said acousto-optic medium by means of an end-of-cell acousto-electric transducer coupled to said acousto-optic scanner.

7. A method according to claim 5, wherein step (b2) comprises generating said output signal representative of said ATWL that has traveled through said acousto-optic medium by means of an end-of-scan opto-electric transducer optically coupled to receive said light beam modulated by said acousto-optic scanner.

8. A method according to claim 1, wherein step (a) comprises digitally adjusting a clock signal generated by a digitally controlled clock signal generator.

9. An apparatus for controlling pixel clock and beam scan timing of an acousto-optic scanner having an acousto-optic medium, through which an acoustic traveling wave lens is launched to bring said beam to sharper focus after passing through the acoustic traveling wave lens produced in said acousto-optic medium, said apparatus comprising an acoustic velocity-driven, phase locked loop containing an adjustable voltage controlled pixel clock generator, which is controlled by a detector coupled to said medium that produces a delayed and attenuated replica of an excitation waveform applied to said scanner, in such a manner that each pixel of said light beam as focused more sharply by said acoustic traveling wave lens is spatially invariant to propagation velocity changes in said medium, whereby, as variations in temperature change the speed of said lens traveling through said medium, said pixel clock is correspondingly slowed down or speeded up by a proportional amount, to maintain registration of pixels of said lens with said light beam in time and space.

10. For use with an acousto-optic scanner having an acousto-optic medium, into which an acoustic traveling wave lens (ATWL) is launched from an acoustic transducer in accordance with an ATWL burst signal that is used to define the spatial size of a light beam scanned across said acousto-optic medium as said light beam is modulated by said ATWL, an arrangement for maintaining a constant scanner pixel rate irrespective of variations in said acousto-optic medium comprising:

an ATWL burst signal generator, which is operative to generate an ATWL burst signal, that is coupled to said electro-acoustic transducer and defines said ATWL and thereby the spatial size of said light beam being scanned across said acousto-optic medium and focused more sharply by said ATWL, with timing of said ATWL burst signal being defined in accordance with a clock signal; and a clock signal generator which is operative to generate said clock signal in accordance with the acoustic velocity of said ATWL through said acousto-optic medium.

11. An arrangement according to claim 10, wherein said clock signal generator is coupled in a phase-locked loop having a control path that includes said ATWL through said acousto-optic medium.

12. An arrangement according to claim 11, wherein said phase-locked loop includes a clock signal feedback path associated with a nominal value of said acoustic velocity delay.

13. An arrangement according to claim 12, wherein said phase-locked loop is operative to produce an acoustic velocity delay error signal in accordance with said control path and said clock signal feedback path, and wherein operation of said clock signal generator is controlled in accordance with said acoustic velocity delay error signal.

14. An arrangement according to claim 11, wherein said ATWL burst signal generator is operative to generate an ATWL burst signal containing a prescribed plurality of cycles of the frequency thereof.

15. An arrangement according to claim 10, wherein the clock signal generated by said clock generator comprises a digitally controlled clock signal generator.

16. An arrangement according to claim 15, further including an end-of-cell acousto-electric transducer coupled to said acousto-optic scanner and being operative to generate an output signal representative of said ATWL that has traveled through said acousto-optic medium, and wherein said clock signal generator is operative to generate said clock signal in accordance with said output signal generated by said an end-of-cell acousto-electric transducer.

17. An arrangement according to claim 15, further including an end-of-scan opto-electric transducer optically coupled to receive said light beam modulated by said acousto-optic scanner and being operative to generate an output signal representative of said ATWL that has traveled through said acousto-optic medium, and wherein said clock signal generator is operative to generate said clock signal in accordance with said output signal generated by said an end-of-scan opto-electric transducer.

18. An arrangement according to claim 17, further including a high pass filter coupled between end-of-scan opto-electric transducer and said clock signal generator.

19. An arrangement according to claim 18, further including a knife edge coupled in an optical path of said light beam and said end-of-scan opto-electric transducer.

* * * * *

UNITED STATES PATENT AND TRADEMARK OFFICE
CERTIFICATE OF CORRECTION

PATENT NO.    : 6,538,690 B1                                              Page 1 of 1
DATED         : March 25, 2003
INVENTOR(S)   : Robert M. Montgomery, Reeder N. Ward and Mark T. Montgomery It is certified that error appears in the above-identified patent and that said Letters Patent is hereby corrected as shown below:

Column 5,
Line 26, delete "scan,s" insert -- "scan's --
Line 42, delete "Is should" insert -- It should --

Column 9,
Line 63, delete "not 25" insert -- not --

Column 10,
Line 28, delete "top" insert -- to --

Column 12,
Line 17, delete "with the it" insert -- with the --
Line 20, delete "step (b) as" insert -- step (b) --

Column 14,
Lines 22 and 30, delete "by said an" insert -- by said --

Signed and Sealed this

Tenth Day of June, 2003

JAMES E. ROGAN
*Director of the United States Patent and Trademark Office*